United States Patent Office 3,573,291
Patented Mar. 30, 1971

3,573,291
CINNAMYLPIPERAZINE PREPARATIONS
Claude E. Fauran, Paris, Gerhard H. Huguet, Malesherbes, Bernard B. P. Pourrias, Meudon-la-Foret, and Michel Turin and Guy G. R. Raynaud, Paris, France, assignors to Delalande S.A. Courbevoie, Hauts-de-Seine, Paris, France
No Drawing. Filed Aug. 16, 1967, Ser. No. 660,902
Claims priority, application France, Aug. 18, 1966, 36,963
Int. Cl. C07d *51/70*
U.S. Cl. 260—240    4 Claims

ABSTRACT OF THE DISCLOSURE

Cinnamylpiperazines useful as pharmaceuticals particularly for treatment of coronary insufficiency, of the formula:

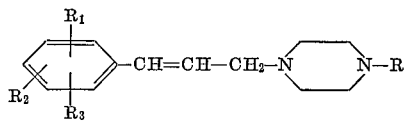

and nontoxic salts thereof,
wherein $R_1$, $R_2$ and $R_3$ each is selected from the group consisting hydrogen, halogen, an alkyl group containing 1 to 4 carbon atoms, a hydroxyl group, an alkoxy group, an amino group and a nitro group,
R is selected from the group consisting of

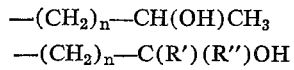

$$-(CH_2)_n-C(R')(R'')OH$$

wherein at least one of R' and R'' is an aromatic radical $$-CH_2)_n-COOR'$$
$$-(CH_2)_n-CO-R'$$
$$-CH_2)_n-CH(OH)CH_2OH$$

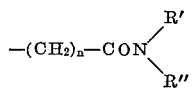

wherein $n=1$ to 4,
R' and R'' each is selected from the group consisting of hydrogen, an aliphatic radical containing 1 to 4 carbon atoms and an aromatic radical, and when

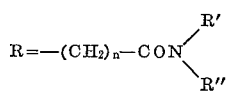

R' and R'' together with N constitutes a heterocyclic radical.

The present invention relates to new cinamylpiperazines which are in particular, capable of use as medicines, more particularly to improve the circulation of the blood and the nutrition of the myocardium; three compounds are therefore particularly valuable in the treatment of coronary insufficiency and of certain cardiac insufficiencies.

The compounds according to the present invention correspond to the general formula:

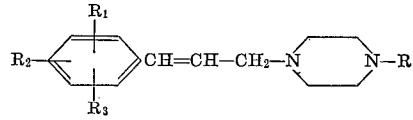

in which:

$R_1$, $R_2$ and $R_3$ each represent a hydrogen or halogen atom, a lower alkyl group containing 1 to 4 carbon atoms, a hydroxyl or alkoxy group, or a nitrogenous substituent such as an amino or nitro group,
R represents an alkyl chain comprising 1 to 6 carbon atoms and carrying various functional oxygenated or nitrogenous groups such as:

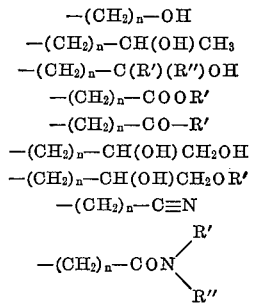

R may also represent a carboxylic ester group of the formula —COOR'.
In all these compounds:

$$n=1 \text{ to } 4$$

And R' and R'' each represent a hydrogen atom, an aliphatic radical containing 1 to 4 carbon atoms, or an aromatic radical. (for example, phenyl or benzyl). In cases in which

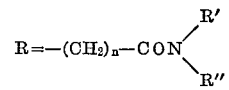

R' and R'' may together with the nitrogen atom constitute a heterocyclic radical (for example a morpholine, piperidine or pyrrolidine radical).
The compounds according to the present invention may be prepared in various ways:
(1) Firstly, cinnamylpiperazine is prepared by reacting substituted or unsubstituted cinnamyl chloride with excess piperazine in absolute ethanol solution. Then the cinnamylpiperazine is reacted in acetone solution with a holegenated derivative corresponding to the radical R in the presence of anhydrous sodium carbonate, or with an epoxide compound of the formula:

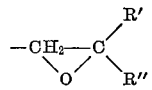

in methanol solution.
(2) From a piperazine mono-substituted by the radical R, in which the substituted piperazine is reacted with a cinnamyl halide in acetone solution in the presence of anhydrous sodium carbonate.

(3) The derivatives in which the radical R carries a tertiary alcohol group of the formula:

$$-(CH_2)_n-\underset{R''}{\underset{|}{\overset{R'}{\overset{|}{C}}}}-OH$$

are obtained from the corresponding ester or ketone in which R represents $-(CH_2)_n-COOR'$ or $$-(CH_2)_n-CO-R'$$

by the action of the corresponding ester or ketone in anhydrous ether with the mixed organo-magnesium derivative $R''MgX$, in which X is a halogen atom. This same type of compound may be obtained reacting the cinnamylpiperazine with an epoxide compound of the formula:

$$-CH_2-\underset{O}{\underset{\diagdown\diagup}{C}}\overset{R'}{\underset{R''}{\diagup\diagdown}}$$

in which R' and R'' are aliphatic or aromatic radicals:

(4) When R is a carboxylic ester group of the formula $-COOR'$, the corresponding compounds are obtained by reacting a chlorocarbonate of the formula $$Cl-COO-R'$$

with the corresponding cinnamylpiperazine in an alkaline medium.

The following Table I indicates different compounds according to the present invention in which $R_1$, $R_2$ and $R_3$ each represent a hydrogen atom, and Table II indicates different compounds according to the present invention in which $R_1 = OCH_3$, and $R_2$ and $R_3$ each represent a hydrogen atom.

TABLE 1

| R | No. | Eb/F °C. | °F. | Empirical formula | M.P. Salt | M.P. °F. | Empirical formula | Calculated C | H | N | O | Cl | Found C | H | N | O | Cl |
|---|---|---|---|---|---|---|---|---|---|---|---|---|---|---|---|---|---|
| $-COO-CH-(CH_3)_2$ | 6597 | $E_{0.01}$ | 170 | $C_{17}H_{24}N_2O_2$ | 288.38 1 HCl | 202 | $C_{17}H_{25}ClN_2O_2$ | 62.85 | 7.76 | 8.62 | 9.85 | 10.91 | 62.90 | 7.88 | 8.50 | 9.73 | 10.87 |
| $-COO-CH_2-C_2H_5$ | 65113 | $E_{0.01}$ | 215 | $C_{17}H_{24}N_2O_2$ | 336.42 1 HCl | 163 | $C_{21}H_{25}ClN_2O_2$ | 67.64 | 6.90 | 7.51 | 8.58 | 9.51 | 67.60 | 6.90 | 7.69 | 8.75 | 9.39 |
| $-CH_2CH_2-CH_2OH$ | 6561 | $E_{0.2}$ | 173 | $C_{16}H_{24}N_2O$ | 260.37 2 HCl | 215 | $C_{16}H_{26}Cl_2N_2O$ | 57.66 | 7.86 | 8.41 | 4.80 | 21.28 | 57.50 | 8.08 | 8.30 | 4.97 | 21.05 |
| $-CH_2-CHOH-CH_3$ | 6562 | $E_{0.2}$ | 180 | $C_{16}H_{24}N_2O$ | 260.37 2 HCl | 228 | $C_{16}H_{26}Cl_2N_2O$ | 57.65 | 7.86 | 8.41 | 4.80 | 21.28 | 57.72 | 8.00 | 8.30 | 4.98 | 21.14 |
| $-CH_2-C(CH_3)_2OH$ | 6579 | $E_{0.05}$ | 168 | $C_{17}H_{26}N_2O$ | 274.39 2 HCl | 215 | $C_{17}H_{28}Cl_2N_2O$ | 58.78 | 8.13 | 8.06 | 4.61 | 20.42 | 58.70 | 8.05 | 8.17 | 4.73 | 20.35 |
| $-CH_2-CH_2-C(CH_3)_2OH$ | 6594 | $E_{0.1}$ | 175 | $C_{18}H_{28}N_2O$ | 288.42 2 HCl | 210 | $C_{18}H_{30}Cl_2N_2O$ | 59.83 | 8.37 | 7.75 | 4.43 | 19.62 | 59.73 | 8.48 | 7.66 | 4.61 | 19.52 |
| $-CH_2-C(C_6H_5)(C_2H_5)OH$ | 65114 | $E_{0.05}$ | 70 | $C_{22}H_{28}N_2O$ | 336.46 2 HCl | 230 | $C_{22}H_{30}Cl_2N_2O$ | 64.54 | 7.39 | 6.84 | 3.91 | 17.32 | 64.54 | 7.24 | 6.69 | 3.83 | 17.22 |
| $-CH_2CHOH-CH_2OH$ | 6571 | $E_{0.1}$ | 210 | $C_{16}H_{24}N_2O_2$ | 276.37 2 HCl | 224 | $C_{16}H_{26}Cl_2N_2O_2$ | 55.01 | 7.50 | 8.02 | 9.16 | 20.30 | 54.82 | 7.47 | 7.93 | 9.03 | 20.14 |
| $-CH_2CHOH-CH_2-O-CH_2-CH=CH_2$ | 65124 | $E_{0.05}$ | 175 | $C_{19}H_{28}N_2O_2$ | 316.43 2 HCl | 230 | $C_{19}H_{30}Cl_2N_2O_2$ | 58.61 | 7.77 | 7.19 | 8.22 | 18.21 | 58.78 | 7.74 | 7.04 | 8.42 | 18.35 |
| $-CH_2-CHOH-CH_2-O-CH_3$ | 6559 | $E_{0.05}$ | 161 | $C_{17}H_{26}N_2O_2$ | 288.38 2 HCl | 195 | $C_{17}H_{28}Cl_2N_2O_2$ | 56.51 | 6.97 | 7.75 | 8.86 | 19.63 | 56.71 | 7.40 | 7.62 | 9.07 | 19.54 |
| $-CH_2-COOC_2H_5$ | 6672 | $E_{0.01}$ | 175 | $C_{17}H_{24}N_2O_2$ | 274.35 2 HCl | 210 | $C_{17}H_{26}Cl_2N_2O_2$ | 57.60 | 7.52 | 8.07 | | 20.42 | 57.50 | 7.70 | 8.05 | | 20.34 |
| $-CH_2-COOC_3H_7(n)$ | 6647 | $E_{0.01}$ | 180 | $C_{18}H_{26}N_2O_2$ | 302.40 2 HCl | 160 | $C_{18}H_{28}Cl_2N_2O_2$ | 57.60 | 7.52 | 7.46 | 8.53 | 18.89 | 57.38 | 7.70 | 7.46 | 8.43 | 18.94 |
| $-CH_2-COOC_2H_5$ | 6570 | $E_{0.1}$ | 160 | $C_{18}H_{26}N_2O_2$ | 302.40 2 HCl | 226 | $C_{18}H_{28}Cl_2N_2O_2$ | 57.60 | 7.52 | 7.46 | 8.53 | 18.89 | 57.81 | 7.70 | 7.24 | 8.43 | 18.93 |
| $-CH_2-CO-CH_3$ | 6567 | | 48 | $C_{16}H_{22}N_2O$ | 258.35 2 HCl | 180 | $C_{16}H_{24}N_2O_2Cl_2$ | 58.00 | 7.30 | 8.46 | 4.83 | 21.41 | 57.96 | 7.22 | 8.54 | 5.05 | 21.29 |
| $-CH_2-CN=$ | 6574 | | 108 | $C_{15}H_{19}N_3$ | 241.33 | | $C_{15}H_{19}N_3$ | 64.67 | 6.73 | 13.31 | | | 64.54 | 6.84 | 13.25 | | |
| $-CH_2-CH=N-$ | 66120 | $E_{0.05}$ | 185 | $C_{16}H_{21}N_3$ | 255.35 Mal. | 165 | $C_{20}H_{25}N_3O_4$ | 57.33 | 6.78 | 11.31 | | 22.57 | 57.24 | 6.96 | 11.27 | | |
| $-CH_2-CO-NH-NH_2$ | 66211 | F | 110 | $C_{15}H_{22}N_4O$ | 274.35 | | $C_{15}H_{22}N_4O$ | 65.66 | 8.08 | 20.42 | | | 65.78 | 8.05 | 20.23 | | |
| $-CH_2-CO-NH_2$ | 66235 | F | 130 | $C_{15}H_{21}N_3O$ | 259.34 | | $C_{15}H_{21}N_3O$ | 54.22 | 6.98 | 12.65 | | 12.61 | 54.38 | 6.89 | 10.35 | | |
| $-CH_2-CO-NH-C_2H_5-O$ | 66236 | F | 130 | $C_{19}H_{29}Cl_2N_3O_2$ | 329.43 2 HCl | 210 | $C_{19}H_{29}Cl_2N_3O_2$ | 56.71 | 7.27 | 10.44 | | 18.89 | 56.78 | 7.05 | 10.35 | | 11.03 |
| $-CH_2-CO-NH-CH(CH_3)_2$ | 6751 | F | 100 | $C_{18}H_{27}N_3O$ | 301.42 2 HCl | 190 | $C_{18}H_{29}Cl_2N_3O$ | 57.75 | 7.81 | 11.23 | | | 57.52 | 7.73 | 11.08 | | |
| $-CH_2-CO-N(C_3H_7)_2$ | 6757 | | | $C_{18}H_{27}N_3O$ | | 215 | $C_{18}H_{27}N_3O$ | 59.06 | 7.57 | 10.88 | | | 59.18 | 7.68 | 10.70 | | |
| $-CH_2-CH_2-CO-CH_3$ | 6762 | F | 80 | $C_{21}H_{33}N_3O$ | 343.49 2 HCl | 215 | $C_{21}H_{35}Cl_2N_3O$ | 60.57 | 8.47 | 10.09 | | | 60.69 | 8.40 | 9.93 | | |
| $-CH_2-C(OH)(CH_3)-CO-CH_3$ | 6767 | F | 190 | $C_{19}H_{28}N_2O_2$ | 286.40 2 HCl | 225 | $C_{19}H_{28}Cl_2N_2O_2$ | 60.16 | 7.85 | 7.80 | | 20.16 | 60.29 | 7.94 | 7.60 | | |
| $-CH_2-C(OH)(CH_3)(CH_5)C_6H_4OCH_3(p)$ | 67100 | F | -90 | $C_{23}H_{30}N_2O_2$ | 366.48 2 HCl | >250 | $C_{23}H_{32}Cl_2N_2O_2$ | 62.86 | 7.34 | 6.38 | | 18.89 | 62.78 | 7.38 | 6.53 | | |
| $-CH_2-CHOH-CH_2-O-C_2H_5$ | 67182 | F | | $C_{18}H_{28}N_2O_2$ | 304.43 | 230 | $C_{18}H_{30}Cl_2N_2O_2$ | 58.43 | 8.24 | 7.16 | | 18.30 | 58.43 | 8.37 | 7.22 | | |
| $-CH_2-CHOH-CH_2-O-CH_2C_6H_5$ | 67200 | F | | $C_{23}H_{30}N_2O_2$ | 291.37 | 210 | $C_{23}H_{32}Cl_2N_2O_2$ | 62.81 | 7.34 | 6.38 | | | 62.81 | 7.29 | 6.47 | | |
| $-CH_2-CHOH-CH_2-O-C_6H_5$ | 67181 | F | | $C_{22}H_{28}N_2O_2$ | 425.39 | 230 | $C_{22}H_{30}N_2O_2Cl_2$ | 62.11 | 7.11 | 6.69 | | 12.12 | 62.13 | 7.18 | 6.55 | | |
| $-CH_2-CHOH-CH_2-O-C_6H_4-Cl(p)$ | 67199 | F | | $C_{22}H_{27}N_2O_2Cl$ | 459.83 | 200 | $C_{22}H_{29}Cl_3N_2O_2$ | 57.46 | 6.36 | 6.09 | | | 57.58 | 6.37 | 6.16 | | |
| $-CH_2-CHOH-CH_2-C\equiv CH$ | 65125 | F | | $C_{18}H_{24}N_2O$ | 387.34 | 195 | $C_{19}H_{28}Cl_2N_2O_2$ | 58.91 | 7.29 | 7.23 | | 22.51 | 58.98 | 7.22 | 7.42 | | |

TABLE II $(R_1 = OCH_3, R_2 \text{ and } R_3 = H)$

| R | No. | Eb/F °C. | °F. | Empirical formula | M.P. Salt | M.P. °F. | Empirical formula | Calculated C | H | N | Found C | H | N |
|---|---|---|---|---|---|---|---|---|---|---|---|---|---|
| $-CH_2-COOC_2H_5$ | 66265 | $E_{0.02}$ | 200 | $C_{18}H_{26}N_2O_3$ | 318.40 2 HCl | 200 | $C_{18}H_{28}Cl_2N_2O_3$ | 55.24 | 7.21 | 7.16 | 55.05 | 7.32 | 6.99 |
| $-CH_2-CO-CH_3$ | 6707 | F | 65 | $C_{17}H_{24}N_2O_2$ | 288.37 2 HCl | 220 | $C_{17}H_{26}Cl_2N_2O_2$ | 56.51 | 7.25 | 7.75 | 56.44 | 7.23 | 7.82 |

The preparation of various compounds in accordance with the present invention will now be described in the following non-limitative examples:

EXAMPLE 1

1-cinnamyl-4-(2'-phenyl-2'-propanol)-piperazine dihydrochloride

Cinnamylpiperazine (0.1 mol) is dissolved in 100 ml. of methanol; then 0.1 mol of methyl styrene oxide is added with stirring and the solution is placed under reflux for 6 hours. The methanol is then removed by distillation. The viscous residue obtained may be distilled (E/0.05=210° C.). The residue is usually dissolved in 250 ml. of acetone and treated with hydrochloric acid to obtain cinnamyl-1 ([phenyl - 2' propanol - 2']1')4-piperazine dihydrochloride; M. Pt.=230° C.

EXAMPLE 2

1-cinnamyl-4 (N pyrrolidinyl acetamido) piperazine dihydrochloride

Cinnamylpiperazine (0.3 mol) is dissolved in 300 ml. of acetone and 32 g. of anhydrous sodium carbonate is added. Then 0.3 mol of N pyrrolidinyl chloro-acetamide is introduced and the solution is placed under reflux for 20 hours. The precipitate is dried and the acetone solution is treated with hydrochloric acid; the di-hydrochloride is separated by drying. M. Pt.=215° C.

EXAMPLE 3

1-cinnamyl-4-(2',3'-propandiol)-piperazine dihydrochloride

Cinnamylpiperazine (0.1 mol) is dissolved in 80 ml. methanol, 0.1 mol of glycidol is then added and the solution is placed under reflux for 1 hour. The methanol is then removed by distillation. The crude based is dissolved in acetone and treated with hydrochloric acid; the di-hydrochloride is dried and recrystallised in alcohol at 96° C.L. M. Pt.=224° C.

EXAMPLE 4

1-cinnamyl-4-(3'-allyloxy-2'-propanol)-piperazine dihydrochloride

A methanol solution (150 ml.) of 0.1 mol cinnamylpiperazine and 0.1 mol of allyloxy-3 epoxy-1.2 propane are placed under reflux for 3 hours. After removal of the methanol, the viscous base obtained is purified by distillation under reduced pressure. E/0.05=175° C.

The dihydrochloride is prepared by action of hydrochloric acid on an acetone solution of the base. M. Pt.=230° C.

EXAMPLE 5

1-cinnamyl-4-(2'-propanone)

An acetone solution of 0.1 mol of cinnamylpiperazine and 0.1 mol of chloroacetone in the presence of 10 g. of anhydrous sodium carbonate are placed under reflux for 4 hours. After filtration the acetone is removed by distillation; the base is dissolved in hydro-chloric acid and after extraction with ether the aqueous solution is treated with caustic soda and extracted three times with ether. After elimination of the solvent, the product obtained is purified by fractional distillation, (E/0.05±157–158° C.); M. Pt.=48° C. The di-hydrochloride, is prepared by reaction of hydrochloric acid with an acetone solution of the base, M. Pt.=180° C.

EXAMPLE 6

1-cinnamyl-4 (ethylacetate)-4 piperazine dihydrochloride 0.1 mol of cinnamylpiperazine and 0.1 mol of ethyl bromoacetate is dissolved in 100 ml. of acetone. The solution is placed under reflux for 6 hours in the presence of 10 g. anhydrous sodium carbonate. After distillation of the solvent, the crude product obtained is purified by fractional distillation, (E/0.05=161° C.). The dihydrochloride, obtained by reaction of hydrochloric acid with the acetone base solution, is recrystallised in ethanol at 95° C.L. M. Pt.=195° C.

PHARMACODYNAMICS

The above-described substances have been tested on animals. They are of particular interest on account of their action on the cardio-vascular, respiratory and central nervous systems, and on metabolism. They possess adrenolytic properties, vaso-dilatory properties at the peripheral level, coronarodilatory, hypotensive and antispasmodic properties, they stimulate respiration, and also possess psycho-analeptic, anti-depressive, uricosuric, hypochlolesteroleminant and hypolipemiant properties.

(1) Adrenolytic properties

The described substances are capable of nullifying, in the cases of dogs, cats and rabbits, the tensional effects of adrenalin, noradrenalin and the excitation of the splanchnic nerve. For certain products there is even a reversal of the hypertensive effect of adrenalin. Moreover, the above-described substances are also capable of inhibiting the contractions of the isolated seminal vesicle of the rat, caused by adrenalin.

(2) Action on the peripheral circulation

Intra-arterial or intra-venous administration of these substances to dogs and rabbits causes peripheral vasodilation resulting in an increase in the supply to the artery irrigating the area concerned. Moreover, arterial administration is capable of relieving the constriction resulting from a previous injection of adrenalin.

(3) Coronaro-dilatory action

Intravenous administration of these substances in a single injection or in a perfusion to dogs is followed by a lasting increase in the supply of coronary circulation, the measurement being taken at a level of the coronary venous sinus. A similar action is manifested on the isolated and the perfused heart of the rabbit.

(4) Action on the heart

The above-described substances, when given in a weak dose, cause an increase of the force of myocardiac contraction. This action has been observed on dogs and cats.

(5) Anti-spasmodic properties

The above-described substances have an inhibitive action on the spontaneous contractions of the uterus in situ and on the contractions of the isolated duodenum obtained by barium chloride. For certain products, the effect is greater than that of papaverin. The effectiveness on the uterus in situ is observed both when administered orally and by intravenous injection.

(6) Stimulating properties on the respiration

The described substances cause an increase in the amplitude and frequency of respiration in rabbits, the respiration of which is depressed by morphine or a barbituric.

(7) Psycho-analeptic and anti-depressive properties

The above-described substances, when administered orally, are capable of causing a state of mild excitation in mice and rats and offer resistance to the effects of reserpine and prochloropemazine.

(8) Uricosuric properties

Singe or repeated, intravenous or oral, administration of these substances on rats is followed by increased elimination of urine, uric acid and reduction of uricemia.

(9) Hypocholesterolemiant and hypolipemiant properties

The above-described substances are capable of reducing hyperlipemia and hypercholesterolemia induced by Triton.

(10) Toxicity

The acute toxicity of the above-described substances on mice, by intravenous and oral administration is slight, in view of effective doses.

The properties of the compounds prepared in Examples 1 to 4 will be described in detail by way of example;

1-cinnamyl-4-(2'-phenyl-2' propanol) piperazine dihydrochloride.

Toxicity:                                    mg./kg.
    DL 50 intravenous _____ 45
    Oral _____ 400 on mice

Adrenolytic activity.—On the isolated siminal vesicle of the rat, activity equivalent to 0.25 yohimbine was obtained.

By intravenous injection on cats, 4.5 mg./kg. of the active compound is capable of nullifying adrenalin hypertension and reducing noradrenalin hypertension.

Vaso-dilatory action.—Injection in the femoral artery of the rabbit of 100 kg. of the active compound doubles the supply of this artery as the result of the peripheral dilation obtained, and is also capable of removing adrenalin vaso constriction;

By intravenous injection 2.5 mg./kg. of the active compound has the same vaso-dilatory effect.

Hypo-tensive action.—Obvious hypertension is obtained after injection of 4.5 mg./kg. of the same active compound.

Anti-spasmodic action.—On the isolated duodenum of the rat, contracted by barium chloride, the activity is twice as great as that of papaverine; on the uterus in situ of the rat, the inhibitive activities on the spontaneous contraction of the uterus is equal to that of papaverine.

Hypo-cholesterolemiant and hypolipemiant action.—On rats treated by Triton, a dose of 100 mg./kg. of the active compound administered orally is capable of lowering hyperlipemia and hypercholesterolemia.

Uricosuric action.—An oral dose of 50–100 mg./kg. of the active compound produces an increase in uric elimination in rats.

1-cinnamyl-4-(N pyrrolidinylacetamido)-(-) piperazine dihydrochloride.—Toxicity: DL 50 intravenous: 125 mg./kg. (mice).

Adrenolytic activity.—On the isolated seminal vesicle of the rat, activity equivalent to that of 0.6 yohimbine was obtained.

10 mg./kg. by intravenous injection reverses the tensional effect of adrenalin, nullifies that of noradrenalin and reduces the excitation of the splanchnic nerve.

Vaso-dilatory activity.—Injection in the femoral artery of the rabbit, of 250 kg. increases the supply of this artery by 50%.

Hypo-tensive action.—An appreciable and durable reduction of arterial tension in dogs and rats is obtained by intravenous injection of 5 mg./kg., or subcutaneous injection of 10 mg./kg. or oral administration of 25 mg./kg. of the active substance repeated daily for a week.

1-cinnamyl-4-(2',3'-propanediol) piperazine di-hydrochloride.

Toxicity:                                    mg./kg.
    DL 50 intravenous _____ 160
    DL 50 oral _____ 68 on mice

Coronary-dilatory action and stimulating respiration.—Intravenous injection of 8 mg./kg. of the active compound causes a lasting 50% increase in the supply of the coronary venous sinus without significant variation in the cardiac rhythm.

With the same dose and the same means of injection a stimulation of the respiration is observed.

Adrenolytic, spasmolytic and vaso-dilatory effects.—The adrenolytic effect of this substance is practically nil, and the spasmolytic and peripheral dilatatory effects are slight.

1-cinnamyl-4-(3'-allyloxy-2'-propanol) piperazine dihydrochloride

Toxicity:                                    mg./kg.
    DL 50 intravenous _____ 66
    DL 50 oral approximate _____ 520 on mice

Oral administration of 25 mg./kg. of this active compound is capable of preventing the trembling due to tremorin and the catalepsy caused by prochloropemazine or resperine.

THERAPEUTICS

Clinical observations

Observation 1.—Four young women (30, 32, 35 and 41 years of age) suffering from Raynaud's disease, all showed local asphyxia of the fingers under the effect of cold. The crises are definite; fingers anaemic, discoloured, sensitivity very reduced, these crises last from quarter of an hour to an hour after immersion in cold water.

The four women were uniformly prescribed 4 pills of 4 cg. of product to be taken twice daily.

On the tenth day three of the patients are resistant to the cold water test. The fourth patient has only creeping and prickling sensations.

All four concur in stating that their movements are much less clumsy. One of them admits spontaneously "that she does not drop things."

Observation 2.—A man 54 years of age, suffering from mitral stricture, has a Raynaud syndrome with capricious angiospastic crises, but with at least one crises per day.

The patient is given 2 pills of 4 cg. of product per day.

By the fifth day the crises are reduced in intensity, and by the tenth day he had had only one crises during the four previous days.

Observation 3.—A man, 63 years of age, shows signs of chronic arthritis of atheromatic origin; his blood chloesterol is 3.20 g., uric acid 83 mg. He feels creeping sensations and numbness in both feet after walking even moderately.

The patient is given a treatment of six pills of 4 cg. of product three times a day.

By the twelfth day tolerance to walking is greatly increased. The patient voluntarily asks for the treatment to be continued. Cholesterol is 2.60 g., uric acid 62 mg.

Observation 4.—Two men ages 62 and 66 years, have series of infarctus of the myocardium in the form of angina pectoris crises at least twice a day and yielding immediately to Trinitrine. The patients are given a treatment of 3 tablets of 5 cg. every 24 hours.

Seen again, one after 20 days the other after 22 days: one of them has not taken any Trinitrine for 5 days the other one has only had one Trinitrine during the last three days, and the crises which persist are greatly reduced in intensity.

What we claim is:

1. A compound of the formula

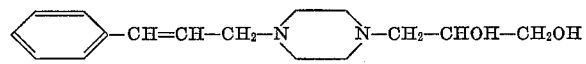

and nontoxic salts thereof.

2. A compound of the formula

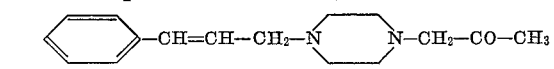

and nontoxic salts thereof.

3. A compound of the formula
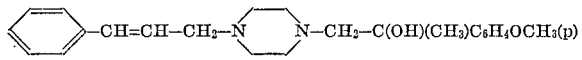
and nontoxic salts thereof.
4. A compound of the formula
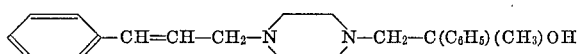
and nontoxic salts thereof.
References Cited
FOREIGN PATENTS
920,416   3/1963   England _____ 260—240
NORMA S. MILESTONE, Primary Examiner
U.S. Cl. X.R.
260—268; 424—250